United States Patent
Sundquist

[11] Patent Number: 5,845,991
[45] Date of Patent: Dec. 8, 1998

[54] FOOD PROCESSOR WITH A PULSE BUTTON MOTOR CONTROL ARRANGEMENT

[75] Inventor: Járl Sundquist, Sollentuna, Sweden

[73] Assignee: AB Hällde Maskiner, Kista, Sweden

[21] Appl. No.: 872,968

[22] Filed: Jun. 11, 1997

[30] Foreign Application Priority Data

Jun. 12, 1996 [SE] Sweden ................................. 9602322

[51] Int. Cl.⁶ .................................................. B02C 25/00
[52] U.S. Cl. ............................. 366/206; 366/601; 241/36
[58] Field of Search ............................... 366/96–98, 100, 366/197, 205, 206, 314, 601; 241/36

[56] References Cited

U.S. PATENT DOCUMENTS

| 3,548,280 | 12/1970 | Cockroft ................................. 366/601 |
| 4,568,193 | 2/1986 | Contri et al. ............................ 366/206 |
| 5,316,382 | 5/1994 | Penaranda et al. . |
| 5,347,205 | 9/1994 | Piland . |
| 5,556,198 | 9/1996 | Dickson, Jr. et al. .................. 366/601 |

*Primary Examiner*—Charles E. Cooley
*Attorney, Agent, or Firm*—Alfred J. Mangels

[57] ABSTRACT

A food processor of the blender or mixer type that includes a machine stand (1), a basin (2) for receiving the foodstuff or foodstuffs to be prepared, a basin lid (3), and one or more knives located on the bottom of the basin and driven by a drive shaft that projects up vertically through the bottom of the basin. The processor is adapted to operate at a speed set by a setting device (5) by virtue of a control circuit (6) or like device that is adapted to cause the motor (7) of the processor to rotate at a speed set by the setting device.

The control circuit (6) functions to control the motor (7) to its full speed from a selected, set speed in response to an electric signal (9) from a pulse button (8) for the duration of the signal from the pulse button (8); and in that the control circuit (6) is adapted to control the motor (7) back to the set selected speed when the signal (9) from the pulse button (8) ceases.

2 Claims, 1 Drawing Sheet

1

FOOD PROCESSOR WITH A PULSE BUTTON MOTOR CONTROL ARRANGEMENT

BACKGROUND OF THE INVENTION

The present invention relates to an arrangement pertaining to food processors that include food cutting means. More specifically, the invention relates to a food processor of the mixer or blender kind.

DESCRIPTION OF THE RELATED ART

Such blenders are of the kind in which the raw foodstuff or foodstuffs to be prepared are present in or are fed down into a basin-like or jug-like container in which a cutting tool is placed on the bottom of the basin. Such machines also include a lid which is placed on the basin when the machine is to be used.

The basin of such blenders is, as a rule, relatively high and is secured against rotation at its lower part on the machine stand. The basin is fitted with a lid when the machine is in use. The knives located on the bottom of the basin are connected to a coupling device beneath the basin, by means of a drive shaft. When the basin, or jug, is fitted to the machine stand, the coupling device engages a further coupling device that is connected to the machine motor by means of a shaft.

Such machines may also be designed for use in so-called industrial kitchens, and also for domestic use. A common feature of these machines is that the cutting tool fitted on the bottom of the basin normally includes two knives that rotate at high speeds, for instance speeds of up to 15,000 r.p.m.

Blenders are primarily used for preparing purees, soups, beverages, sauces and other finely-divided food products.

A blender is driven at different speeds in the preparation of different finely-divided food products, wherein the blender speed is adapted to the product being processed in the blender. There is provided to this end a setting knob or the like by means of which the speed at which the knives rotate can be adjusted smoothly from, e.g., 500 r.p.m. to 15,000 r.p.m.

When processing food in a blender, it is normally necessary to greatly increase the blender speed from a given set speed for a short period of time, for instance for a second or two, and therewith cause the contents of the blender to rise in the basin and pick-up foodstuff that has splashed up onto the inner surface of the basin, or change the flow profile in the blender, for instance.

Accordingly, several known commercially available blenders have a button which when pressed will drive the blender at full speed for as long as the button is held pressed. However, this button will not function until the setting knob has been set to zero speed or has been set to a special position in which the blender will run at full speed.

Thus, when using this facility it is first necessary to set the blender to a desired speed and after a short period of time to turn the setting knob to zero and then press the button to bring the blender to its top speed. The person working the machine must then reset the blender to the earlier chosen speed. This procedure is both time-consuming and complicated.

The present invention eliminates this drawback.

SUMMARY OF THE INVENTION

The present invention thus relates to a blender or mixer type food processor that includes a machine stand, a basin or jug that accommodates the foodstuff or foodstuffs to be processed, a basin lid and one or more knives mounted on the bottom of the basin and driven by means of a drive shaft that projects up vertically through the bottom of the basin. The food processor is adapted to operate at a speed set by means of a setting device through the medium of a control circuit or the like which functions to cause the motor of the processor to rotate at a speed set by said setting device. The control circuit is adapted to control the motor to full speed from any pre-set speed in response to an electric signal from a pulse button for the duration of said signal. The control circuit is adapted to re-set the motor to said selected pre-set speed when the signal from the pulse button ceases.

BRIEF DESCRIPTION OF THE DRAWINGS

The present invention will now be described in more detail with reference to an exemplifying embodiment thereof and also with reference to the accompanying drawing, in which.

DESCRIPTION OF THE PREFERRED EMBODIMENTS

Figure 1:
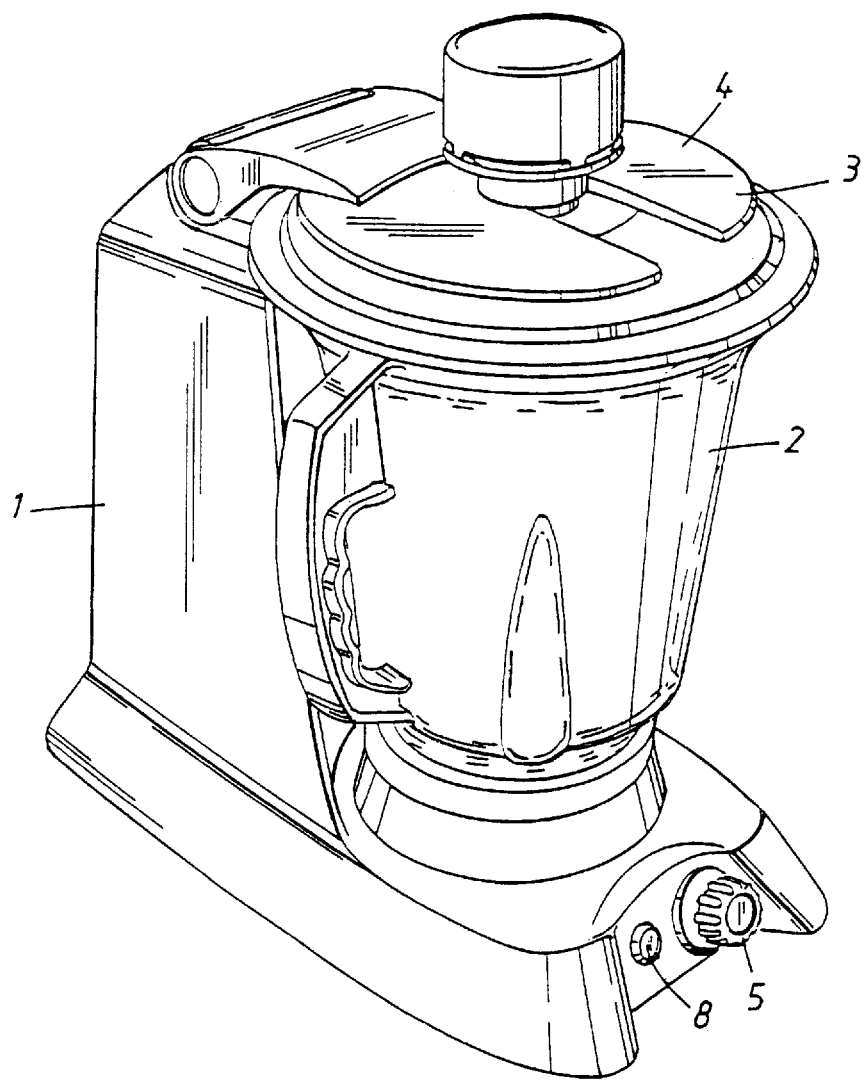
FIG. 1 is a perspective view of an inventive food processor.
Figure 2:
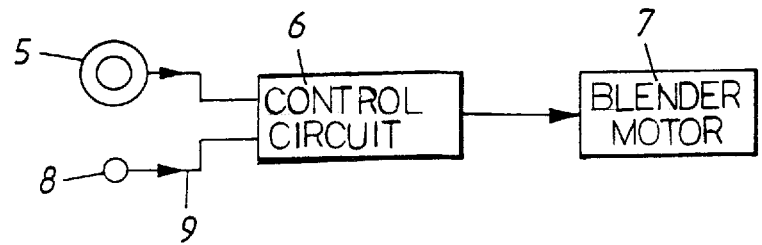
FIG. 2 is a block schematic.

FIG. 1 illustrates a food processor in the form of a blender or mixer that includes a machine stand 1, a basin or jug 2 which receives the foodstuff or foodstuffs to be prepared, and a basin lid 3. Mounted in a known manner on the bottom of the basin 2 are knives that are driven by means of a drive shaft that projects up vertically through the bottom of the basin. The blender illustrated in FIG. 1 is provided with a raisable and lowerable lid holder 4. The blender is adapted to operate at a speed of, e.g., between 500 and 15,000 r.p.m., which is set by means of a setting device 5. The setting device 5 may be a typical setting knob or may have the form of electric buttons coupled to a display.

The illustrated blender also includes a control circuit 6 or like means that functions to control the blender motor 7 to rotate at a speed set by means of the setting device 5.

In accordance with the invention, the control circuit 6 is adapted to control the motor 7 to its top speed from a selected speed set by means of the setting device 5 and in response to an electric signal 9 from a pulse button 8, for the duration of said pulse signal. The speed of the motor is therewith increased directly from the set speed to said top speed without needing to touch the setting device. The control circuit 6 is also adapted to control the motor back to the set selected speed when the signal 9 from the pulse button 8 ceases, i.e., when the pulse button is released.

This means that the person working the blender need only press the pulse button for a short period of time when the blender is required to operate at full speed, and then release the button.

The present invention thus eliminates the drawback described in the introduction.

The control circuit is of a known kind suitable for controlling electric motors. The pulse button is a typical press switch which is constantly in an outwardly projecting position until pressed.

It will be understood that modifications can be made without departing from the concept of the invention.

The present invention shall not therefore be considered to be limited to the aforedescribed exemplifying embodiments, since modifications and variations can be made within the scope of the following claim.

What is claimed is:

1. A food processor comprising: a machine stand, a basin for receiving a foodstuff to be prepared, a basin lid, and at least one knife located within the basin and driven by a drive shaft that projects up vertically into the basin, a drive motor coupled to the drive shaft, a manually operable motor speed setting device, a control circuit connected with the speed setting device and with the motor to control the motor to rotate at a speed set by the speed setting device, a pulse button coupled to the control circuit for providing an electrical signal to the control circuit, wherein the control circuit controls the motor to operate at full speed from a selected, set speed in response to the electrical signal from the pulse button and for the time duration of the electrical signal from said pulse button; and wherein the control circuit controls the motor to rotate at a speed set by the speed setting device when the signal from the pulse button ceases.

2. A food processor according to claim 1, wherein the time duration of the pulse button electrical signal is the time period during which the pulse button is operated.

* * * * *